United States Patent [19]

Asaoka et al.

[11] Patent Number: 4,631,434
[45] Date of Patent: Dec. 23, 1986

[54] INTERNAL COMBUSTION ENGINE STARTER HAVING LAMINATED PLATES SIMULTANEOUSLY FORMING THE SWITCH YOKE AND THE MOTOR YOKE

[75] Inventors: Ryuji Asaoka, Okazaki; Yasuhiro Nagao, Kariya, both of Japan

[73] Assignee: Nippondenso Co., Ltd., Kariya, Japan

[21] Appl. No.: 723,285

[22] Filed: Apr. 15, 1985

[30] Foreign Application Priority Data

Apr. 18, 1984 [JP] Japan .................................. 59-78900

[51] Int. Cl.⁴ .............................................. H02K 1/12
[52] U.S. Cl. .................................. 310/112; 290/38 R; 310/216
[58] Field of Search ..................... 290/38, 48; 74/7 A; 310/66, 68 R, 83, 112, 118, 121, 216, 217, 218

[56] References Cited

U.S. PATENT DOCUMENTS 3,433,468  3/1969  Broyden .......................... 290/38 R
4,220,883  9/1980  Padoan ............................. 310/216
4,340,829  7/1982  McCoy ............................... 310/71

FOREIGN PATENT DOCUMENTS 58-52321  11/1983  Japan .

Primary Examiner—Patrick R. Salce
Assistant Examiner—D. L. Rebsch
Attorney, Agent, or Firm—Cushman, Darby & Cushman

[57] ABSTRACT

A starter for an internal combustion engine having a starter motor and a magnet switch arranged in parallel with the starter motor, wherein a switch yoke of the magnet switch and a motor yoke of the starter motor are formed by laminating a plurality of magnetic lamination plates having a first section forming the switch yoke, a second section forming the motor yoke, and a connecting portion forming a common magnetic flux path for both sections.

11 Claims, 12 Drawing Figures

4,631,434

INTERNAL COMBUSTION ENGINE STARTER HAVING LAMINATED PLATES SIMULTANEOUSLY FORMING THE SWITCH YOKE AND THE MOTOR YOKE

BACKGROUND OF THE INVENTION

1. Field of the Invention

This invention relates to a starter for cranking an internal combustion engine, and more particularly to a starter, wherein a stator for a yoke of a starter motor as well as that of a magnet switch are formed of a plurality of lamination plates as a unitary body.

2. Brief Description of Prior Art

As disclosed in U.S. Pat. No. 4,340,829, a yoke of a starter motor comprises a plurality of lamination plates of magnetic material.

Further, as disclosed in Japanese Examined Patent Publication No. 58-52321, a yoke of a magnet switch for a starter is also formed of a plurality of lamination plates of magnetic material.

SUMMARY OF THE INVENTION

It is therefore an object of the present invention to provide a starter which is small in size.

It is another object of the invention to facilitate the step of assembling a stator for the yoke of a starter motor and that of a magnet switch to a starter housing.

According to one aspect of the invention, there is provided a starter, comprising: a starter motor having a motor yoke, and a magnet switch arranged in parallel with the starter motor and having a switch yoke. The motor yoke and switch yoke comprise a plurality of first lamination plates and a plurality of second lamination plates. Each of the first lamination plates has a first annular section, a second annular section and a connecting portion. Each of said second lamination plates having a first C-shaped section, a second C-shaped section and a pair of connecting portions. The first annular sections and the C-shaped sections form the switch yoke, and the second annular sections and the C-shaped sections form the motor yoke.

The above and other objects, features and advantages of the invention will become more apparent from the following description and appended claims, taken in conjunction with the accompanying drawings which show by way of example some preferred embodiments of the invention.

DETAILED DESCRIPTION OF PREFERRED EMBODIMENTS

The present invention will now be explained with reference to the attached drawings showing embodiments of the present invention.

In FIGS. 1 to 8, which show a first embodiment, a starter motor M is arranged in parallel with a magnet switch MS.

Figure 4:
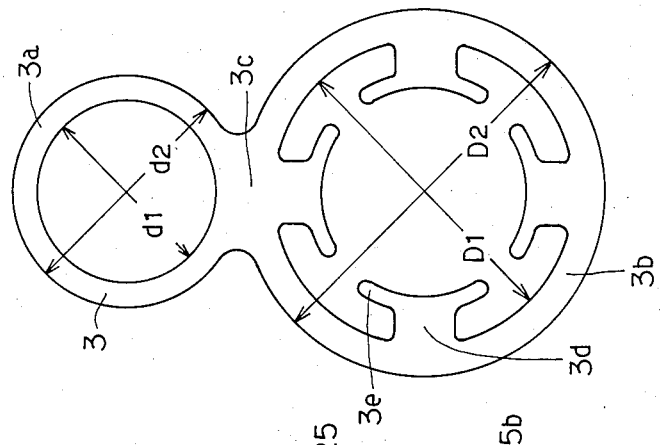
FIG. 4 is a front view showing a first lamination plate of magnetic material forming a first laminated yoke in the first embodiment.

Numeral 1 designates a stator comprising a first laminated yoke 2 and a pair of second laminated yokes 4 arranged at both sides of the first laminated yoke 2, the first and second yokes 2 and 4 being made of magnetic material. As illustrated in FIG. 4, each first lamination plate 3 of the first laminated yoke 2 has a first annular section 3a, a second annular section 3b and a connecting portion 3c. The second annular sections 3b are formed with four pole cores 3d extending radially inwardly and arranged circumferentially at equal intervals, each pole core 3d having at its inner end a pole piece 3e.

Figure 1:
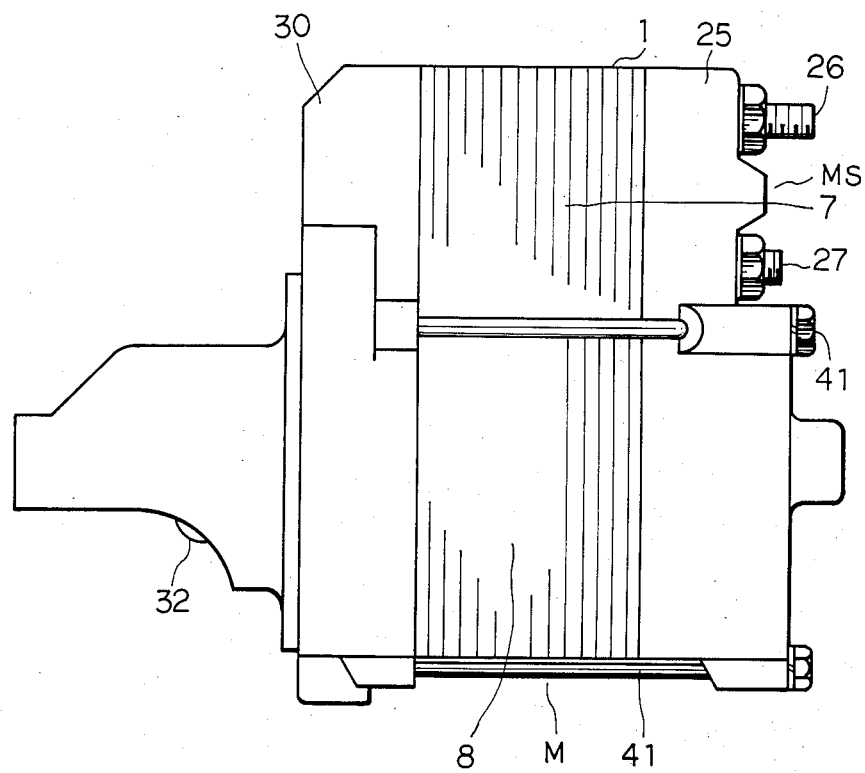
FIG. 1 is a front view showing a starter according to a first emobdiment of the present invention.
Figure 5:
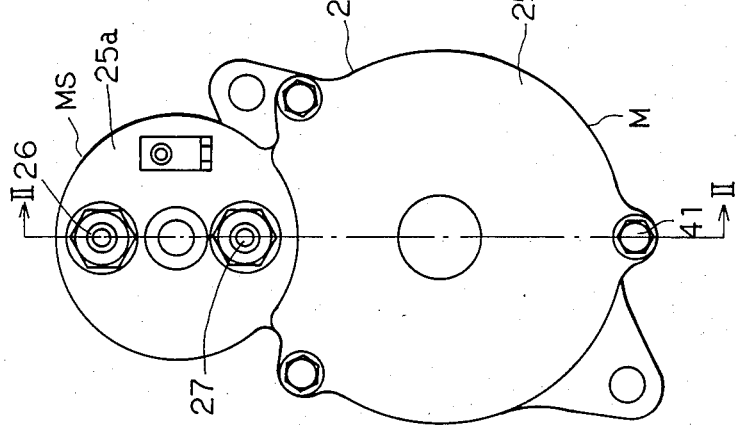
FIG. 5 is a front view showing a second lamination plate of magnetic material forming a second laminated yoke in the first embodiment.

As illustrated in FIG. 5, each second lamination plate 5 of the second laminated yoke 4 has a first C-shaped section 5a, a second C-shaped section 5b and a pair of connecting portions 5c. The inner diameters $d_3$ and $D_3$ of the second lamination plate 5 are made equal to $d_1$ and $D_1$ of the first lamination plate 3, while the outer diameters $d_4$ and $D_4$ of the second lamination plate 5 are made smaller than $d_2$ and $D_2$ of the first lamination plate 3, so that a pair of step portions 1a are formed at the outer peripheries of both ends of the first laminated yoke 2 as seen in FIGS. 1 and 6.

Figure 6:
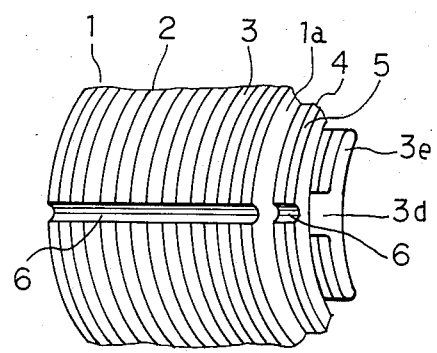
FIG. 6 is a perspective view showing a major portion of the laminated stator for the starter in the first embodiment.

A plurality of the first and second lamination plates 3 and 5 are fixed with each other by means of welding as seen in FIG. 6. In FIG. 6, numeral 6 designates a welded portion on the outer periphery of the stator 1. Although not shown in FIG. 6, it is apparent that several outer peripheral portions are welded. And the first annular and C-shaped sections 3a and 5a form a switch yoke 7 for the magnet switch MS, while the second annular and C-shaped sections 3b and 5b form a motor yoke 8 for the starter motor M. As a result, the axial length of the switch yoke 7 is equal to that of the motor yoke 8.

Figure 2:
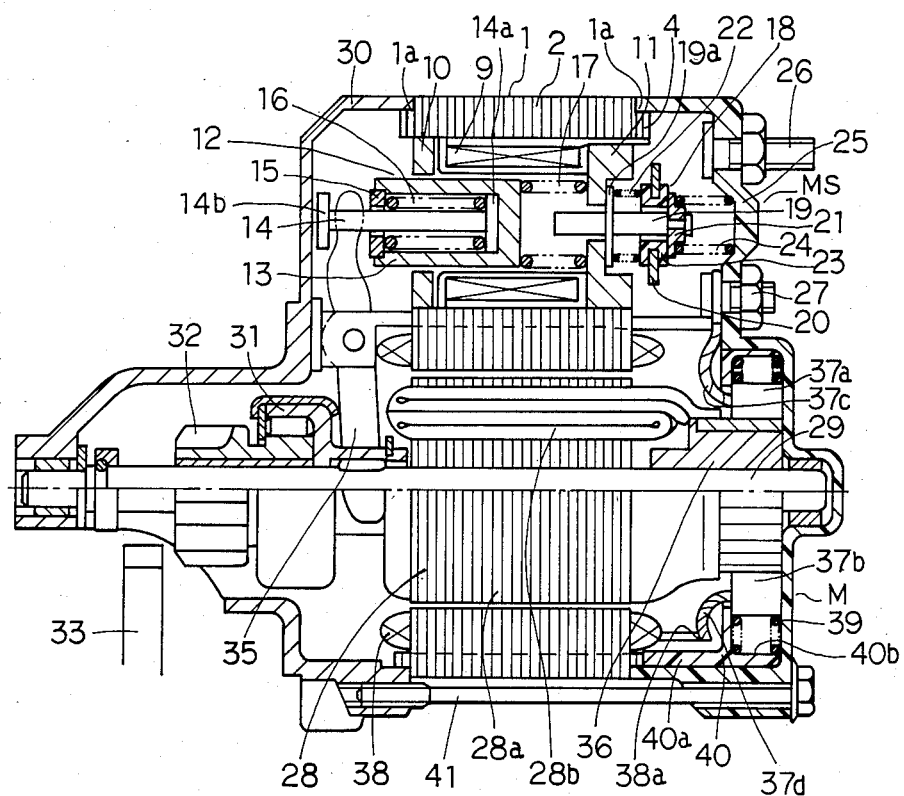
FIG. 2 is a cross-sectional view taken along a line II—II of FIG. 3.
Figure 3:
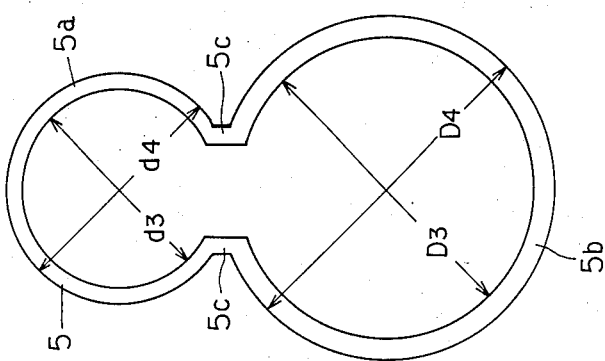
FIG. 3 is a side view of the starter shown in FIG. 1.

In FIG. 2, solenoid coil 9 is fixed to the inner periphery of the switch yoke 7. Annular stationary cores 10 and 11 are arranged at both ends of the solenoid coil 9 and press-fitted into the inner periphery of the switch yoke 7. The switch yoke 7 and the stationary cores 10 and 11 constitute a magnetic path for magnetic fluxes from the solenoid coil 9 when it is energized. Plunger 12 is axially slidably and held within the solenoid coil 9.

The plunger 12 is pulled into solenoid coil 9 when the solenoid coil 9 is energized. And the plunger 12 comprises a cylindrical movable core 13, a rod 14 having two radial flanges 14a and 14b at both ends, a washer 15 press-fitted into the open end of the movable core 13 and a drive spring 16 acting between the washer 15 and the radial flange 14a of the rod 14. The drive spring 16 pushes the rod 14 towards the closed end of the movable core 13. Numeral 17 designates a return spring acting between the movable core 13 and the stationary core 11 for pushing the plunger 12 to the left side.

Numeral 18 designates a movable contact assembly including a push rod 19 and a movable contact 20. The push rod 19 having a flange 19a is axially slidably held within the stationary core 11, and a washer 21 is fixed to the one end of the push rod 19. The movable contact 20, arranged coaxially to the plunger 12, is insulated from the push rod 19 by means of an insulating bush 23, and is axially slidably held on the outer periphery of the push rod 19. Contact spring 22 acts between the flange 19a of the push rod 19 and the insulating bush 23. Return spring 24 acts between the washer 21 and an end frame 25 for pushing the movable contact assembly 18 against the stationary core 11. Numerals 26 and 27 designate a pair of fixed contacts to which the movable contact 20 is engaged when the solenoid coil 9 is energized. The fixed contact 26 is connected to a battery (not shown).

In FIG. 2, numeral 28 designates an armature for the starter motor M arranged within the motor yoke 8, which is likewise formed of a plurality of laminated magnetic metal plates 28a. Each of the metal plates 28a can be made at the same time as the lamination plates 3 for the stator 1 are press-cut, thereby reducing material costs. A motor shaft 29 of the armature 28 is rotatably supported by a starter housing 30 and the end frame 25 by means of bearings. The peripheral end of the starter housing 30 is fitted to the step portion 1a of the stator 1. Over-running clutch 31 is rotatably and slidably supported on the motor shaft 29. Pinion 32 is mounted on the motor shaft 29 for engagement with a ring gear 33 of an internal combustion engine when the starter is operated. The over-running clutch 31 transmits the rotational force from the motor shaft 29 to the pinion 32.

Lever 35 is supported by and held within the starter housing 30. One end of the lever 35 is engaged with the rod 14 between the flange 14b and the washer 15, while the other end is engaged with the over-running clutch 31.

Commutator 36 is mounted on a rear end of the motor shaft 29, for supplying an armature coil 28b of the armature 28 with electric power.

Numerals 37a and 37b designate brushes slidably supported by the end frame 25 so that they may contact the outer periphery of the commutator 36. A pigtail 37c of the brush 37a is connected to the fixed contact 27, while a pigtail 37d of the other brush 37b is connected to one side 38a of a field-coil 38 wound at the pole core 3d, the other end of which is grounded through the stator 1.

Figure 7:
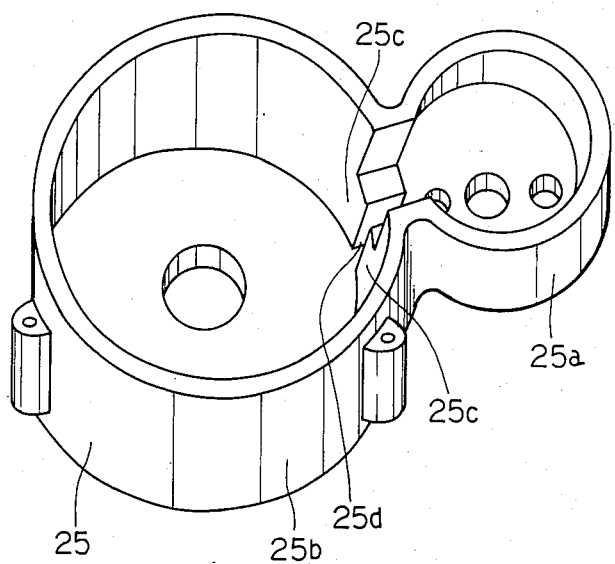
FIG. 7 is a perspective view showing an end frame of the starter in the first embodiment.

Referring to FIG. 7 showing the end frame 25 made of insulating material (e.g. resin, ceramics), the end frame 25 has a first cup-shaped section 25a for covering one end of the switch yoke 7 and a second cup-shaped section 25b for covering one end of the motor yoke 8, wherein the peripheral end of the end frame 25 is fitted to the step portion 1a of the stator 1. A groove 25d is formed at a wall 25c between the first and second cup-shaped sections 25a and 25b for receiving therein the pigtail 37c extending from the brush 37a to the fixed contact 27, with a result that the pigtail 37c can be firmly supported by the end framer 25.

Figure 8:
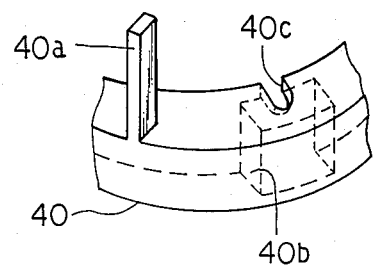
FIG. 8 is a perspective view showing a major portion of a brush holder of the starter in the first embodiment.

In FIG. 8, there is shown an annular brush holder 40 made of insulating resin. The brush holder 40 comprises a plurality of projections 40a extending to the stator 1, a pair of depressions 40b open to the side of the end frame 25 and to the side of the commutator 36 and a pair of slits 40c for passing therethrough the pigtails 37c and 37d. And the brushes 37a and 37b and brush springs 39 are respectively arranged in the depressions 40b of the brush holder 40, so that the brush springs 39 push the brushes 37a and 37b toward the commutator 36. The brush holder 40 is interposed between the side wall of the stator 1 and the inner end surface of the second cup-shaped section 25b, whereby the pair of brushes 37a and 37b are slidably held in the respective depressions 40b.

Numeral 41 designates bolts for holding the stator 1 between the housing 30 and the end frame 25. The housing 30 is fixed to the internal combustion engine (not shown).

In operation, when a starter switch (not shown) is closed to energize the solenoid coil 9, the plunger 12 is pulled to the right side against the spring force of the return spring 17. The movable contact assembly 18 is pushed toward the fixed contacts 26 and 27 against the spring force of the return spring 24 as the plunger 12 moves. The rod 14 of the plunger 12 pulls the lever 35 to make the pinion 32 slide on the motor shaft 29 so as to engage the pinion 32 with the ring gear 33 of the internal combustion engine. When the movable contact 20 closes the fixed contacts 26 and 27, electric power is supplied to the starter motor M from the battery (not shown). When the starter motor M begins to rotate, its rotational force is transmitted to the pinion 32 through the over-running clutch 31, and then to the ring gear 33, so that the internal combustion engine is cranked up.

As understood from the foregoing description, since the switch yoke 7 and the motor yoke 8 are made of common lamination plates 3 and 5, the switch yoke 7 and the motor yoke 8 can be simultaneously assembled to the starter housing 30, resulting in a reduction in the number of assembling steps, a reduction of product cost and furthermore, a reduction in size.

Figure 9:
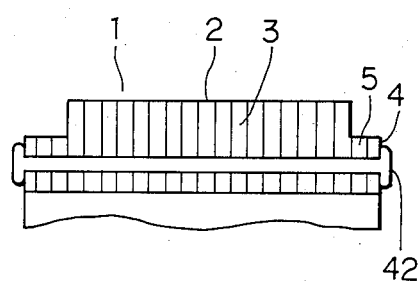
FIG. 9 is a longitudinal sectional view showing a major portion of a laminated stator for a starter according to a second embodiment of the present invention.

FIG. 9 illustrates a second embodiment of the invention, which differs from the first embodiment in that the first and second lamination plates 3 and 5 are fixed to each other by means of several bolts 42 instead of welding.

Figure 10:
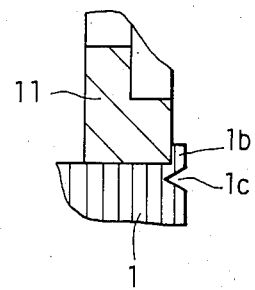
FIG. 10 is a longitudinal sectional view showing a major portion of the laminated stator and an iron plate for a magnet switch according to a third embodiment of the present invention.

In FIG. 10, showing a third embodiment of the present invention, a plurality of bending portions 1b are made by forming a plurality of notches 1c on the outermost second lamination plates 5, so that the stationary cores 10 and 11 are more firmly fixed to the stator 1.

Figure 11:
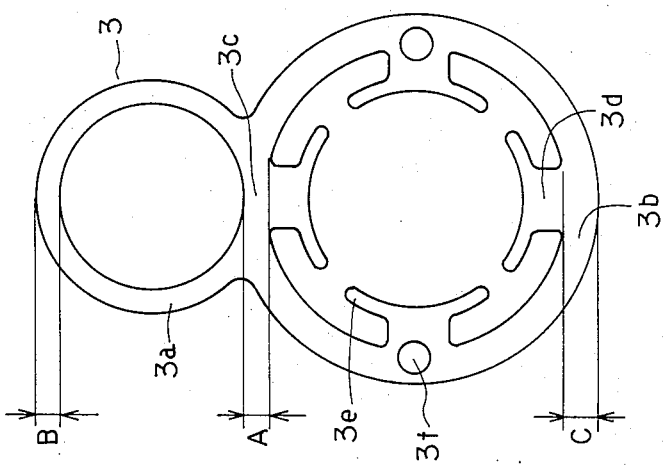
FIG. 11 is a front view showing a first lamination plate of magnetic material forming a first laminated yoke according to a forth embodiment of the present invention.

In FIG. 11, showing a fourth embodiment of the present invention, the connecting portion 3c is used as a common magnetic path for the magnetic fluxes flowing through the switch yoke 7 and the motor yoke 8, and for that purpose the width A of the connecting portion 3c is made smaller than the width obtained by adding the width B of the switch yoke 7 to the width C of the motor yoke 8. Accordingly, the starter of the fourth embodiment can be made smaller in size than that of the first embodiment.

In this fourth embodiment, a pair of holes 3f can be formed in the pole core 3d and or in the second annular section 3b, through which the bolts 41 are positioned, so that the bolts 41 hold the stator 1 between the starter housing 30 and the end frame 25. Accordingly, the starter can be made even smaller in size.

Figure 12:
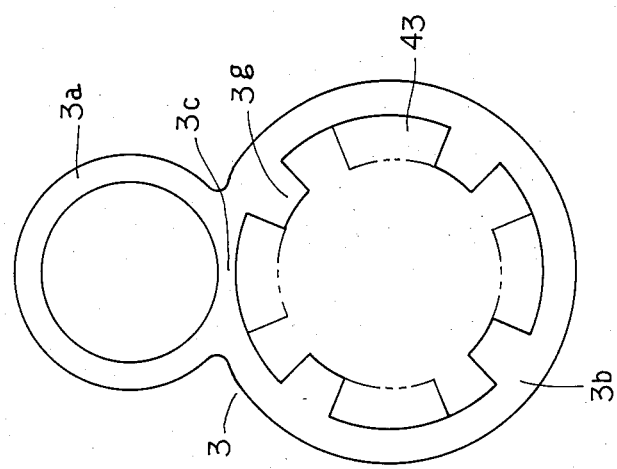
FIG. 12 is a front view showing a first lamination plate of magnetic material forming a first laminated yoke according to a fifth embodiment of the present invention.

FIG. 12 shows a fifth embodiment of the present invention, wherein permanent magnets 43 are used as a magnetic field for a starter motor M in place of the field-coils 38. For that purpose, four interpoles 3g are integrally formed with the first lamination plates 3, and are arranged at circumferentially equal intervals. In FIG. 12, a two-dot chain line designates a permanent magnet 43 to be fixed to the inner periphery of the motor yoke 8.

The present invention can be also applied to a starter, in which the axial length of the switch yoke 7 is shorter than that of the motor yoke 8.

What is claimed is:

1. A starter for an internal combustion engine, comprising:
    a starter motor having a motor yoke; and
    a magnet switch arranged in parallel with said starter motor and having a switch yoke;
    wherein said motor yoke and switch yoke comprise a plurality of first lamination plates and a plurality of second lamination plates,
    each of said first lamination plates having a first annular section, a second annular section and a connecting portion,
    each of said second lamination plates having a first C-shaped section, a second C-shaped section and a pair of connecting portions,
    said first annular sections and said first C-shaped sections forming said switch yoke,
    said second annular sections and said second C-shaped sections forming said motor yoke.

2. A starter according to claim 1, wherein:
    inner diameters of said first and second annular sections of said first lamination plates are substantially equal to inner diameters of said first and second C-shaped sections of said second lamination plates, respectively; and
    outer diamters of said first and second C-shaped sections of said second lamintaion plates are smaller than outer diameters of said first and second annular sections of said first lamination plates, respectively, so that a pair of step portions are formed at both peripheral ends of said first laminated plates.

3. A starter according to claim 2, further comprising:
    an end frame having a first cup-shaped section for covering one end of said switch yoke, and a second cup-shaped section for covering one end of said motor yoke, said first and second cup-shaped sections being fitted to one of said step portions.

4. A starter according to claim 3, further comprising a starter housing fitted to the other one of said step portions.

5. A starter according to claim 1, wherein said second annular sections include a plurality of pole cores, each having a pole piece extending radially inwardly.

6. A starter according to claim 1, wherein a width of each of said connecting portions is made smaller than a width of said first annular section added to a width of said second annular section.

7. A starter according to claim 1, further comprising:
    a plurality of permanent magnets fixed to an inner periphery of said second annular section; and
    a plurality of interpoles, each connected to said inner periphery of said second annular section.

8. A starter for an internal combustion engine comprising:
    a starter motor having a motor yoke; and
    a magnet switch arranged in parallel with said starter motor and having a switch yoke,
    wherein said motor yoke and switch yoke comprise a plurality of magnetic lamination plates having a section for forming said switch yoke, a second section for forming said motor yoke and a connecting portion connecting said first section with said second section,
    said connection portion being a common magnetic path for magnetic fluxes flowing through said switch yoke and said motor yoke.

9. A starter according to claim 8, wherein a radial width of said connecting portion is made smaller than a radial width of said first annular section added to a radial width of said second annular section.

10. A starter for an internal combustion engine comprising:
    a starter motor having a motor yoke and an armature;
    a magnet switch arranged in parallel with said starter motor and having a switch yoke;
    a starter housing covering said switch yoke and said motor yoke and supporting a said armature; and
    an end frame covering said switch yoke and said motor yoke;
    wherein said motor yoke and said switch yoke comprise a plurality of first lamination plates and a plurality of second lamination plates, outer diameters of said second lamination plates being smaller than outer diameters of said first lamination plates,
    each of said first lamination plates and said second lamination plates having a first section forming said switch yoke, a second section forming said motor yoke, and a connecting portion used as a common magnetic path for magnetic fluxes flowing through said switch yoke and said motor yoke,
    peripheral ends of said starter housing and said end frame being fitted to step portions formed between said first lamination plates and said second lamination plates.

11. A starter according to claim 10, further comprising:
    brushes for supplying electric power to said armature; and
    brush holders, each having a depression for holding one of said brushes, and a projection interposed between said motor yoke and end frame.

* * * * *